United States Patent

Mehnert

[11] 3,751,207
[45] Aug. 7, 1973

[54] APPARATUS FOR BLOW MOLDING

[75] Inventor: Johannes Mehnert, Mendenuber Sieburg, Germany

[73] Assignee: Siemag Siegener Maschinenbau Gesellschaft mit beschrankter Haftung, Bundesrepublik, Germany

[22] Filed: Mar. 10, 1972

[21] Appl. No.: 233,437

Related U.S. Application Data

[63] Continuation-in-part of Ser. No. 862,796, Oct. 1, 1969, abandoned.

[52] U.S. Cl. .................... 425/326, 425/DIG. 206
[51] Int. Cl. ............................................ B29d 23/03
[58] Field of Search ............ 425/249, 326 B, 387 B

[56] References Cited
UNITED STATES PATENTS

| 2,657,431 | 11/1953 | Slaughter | 425/326 X |
|---|---|---|---|
| 2,936,481 | 5/1960 | Wilkalis et al. | 425/249 |
| 2,908,034 | 10/1959 | Hackett | 425/387 X |
| 3,288,898 | 11/1966 | West | 425/326 X |
| 3,477,097 | 11/1969 | Plymale | 425/326 X |
| 3,496,597 | 2/1970 | Ayres | 425/387 |
| 3,503,099 | 3/1970 | Uhlig | 425/249 |

Primary Examiner—J. Spencer Overholser
Assistant Examiner—Michael O. Sutton
Attorney—Norman S. Blodgett

[57] ABSTRACT

This invention relates to apparatus for molding and, more particularly, to apparatus for the fabrication of hollow bodies from thermo-plastic material wherein, during a first fabrication step, the piece is pre-fabricated and, in a second step, the piece is positioned within a mold to form the hollow body by blowing until the hollow body reaches the desired shape.

15 Claims, 7 Drawing Figures

APPARATUS FOR BLOW MOLDING

CROSS-REFERENCE TO RELATED APPLICATIONS

This application is a continuation-in-part of patent application Ser. No. 862,796 filed Oct. 1,1969, now abandoned.

BACKGROUND OF THE INVENTION

In the molding of hollow articles of thermo-plastic materials, the two well-known fabrication procedures are called "extrusion blow molding" and "injection blow molding." The extrusion blow molding method starts with an extruded tube (parison) and the base of the article is formed by clamping off a section of the tube with the mold (which usually consists of two parts). The separated piece is thereafter expanded within the mold in order to form a hollow body which is complementary to the mold. A disadvantage of this procedure consists of the fact that the squeezing off of the raw piece causes material protrusions to be formed within this area; these must be removed during or after the fabrication process. This results not only in loss of the material but also in an additional expenditure for the work of remedying the flow. Another difficulty experienced in extrusion blow molding is that, in order to form the parison, ther is a large machining expenditure involved in providing a suitable nozzle. At the same time, irregularities occur during the fabrication; these irregularities can be the result of the devices for holding the nozzles or can occur because of the conditions occuring during the flow around the air-injection needle. In the case of vertical extrusions, there is the danger of undue extension or swinging of the tube and, in the case of horizontal extrusions, a sagging of the tube cannot be prevented. In addition, this procedure requires devices for the welding of seamlines and the guiding of the bar of the tube. A further disadvantage is found in that the fabrication of the tube is basically a continuous procedure, while the blowing procedure and the separation of the raw piece are of a discontinuous nature, which fact makes it necessary to co-ordinate these two different moving procedures.

The injection blow molding method, on the other hand, avoids a number of the disadvantages set forth above but has its own weaknesses. For example, a relatively high pressure is necessary to press the plastic material through the narrow nozzle into the injection molding recess. The high pressure presents difficulties in centering the pressure air needle which is inserted into the molding, particularly when this bar is thin and long. It has been proven, as a practical matter, that the relationship of the length of the bar to its diameter cannot be greater than a ratio of 2.5/1 if a dislocation of the free end of the bar is to be avoided. It is necessary to prevent such a dislocation of the free end of the bar, because a small variation in location of the bar within the recess can lead to a blowup of the raw material during the blowing procedure. It is possible to center long and thin air needles by providing additional support elements, but such a procedure (which, theoretically, permits the use of longer bars) calls for the use of difficult procedures and complex devices to prevent the sagging of the bar. In the use of the injection blow molding process, it is extremely critical to coordinate and control the injection pressure, temperature distribution, and other factors. It is particularly important that the surface temperatures of the raw piece is not allowed to become too high, otherwise the material will stick when the surfaces are removed. On the other hand, if the raw piece has a cool surface blowing becomes difficult. Therefore, a compromise has to be made by adjusting the surface temperature and very careful workmanship is required. These and other difficulties experienced with prior art apparatus have been obviated in a novel manner by the present invention.

It is therefore, an outstanding object of the invention to provide apparatus for molding which eliminates the disadvantages of extrusion blow molding and injection blow molding, while at the same time combining the advantages of these two procedures.

Another object of this invention is the provision of apparatus for molding which eliminates machine work in the case of extrusion blow molding and the forming of unwantd protrusions on the formed article.

A further object of the present invention is the provision of apparatus for molding in which the operating procedures are simplified and the wall thickness of the parison and of the final formed article is readily controllable.

It is another object of the instant invention to provide apparatus for molding in which waste of materials and trimming work are virtually eliminated.

With these and other objects in view, as will be apparent to those skilled in the art, the invention resides in the combination of parts set forth in the specification and covered by the claims appended hereto.

SUMMARY OF THE INVENTION

In general, the invention consists of an apparatus for molding having an extruder with an outlet bore and a mold having a recess aligned with the bore. A blow rod extends through the mold and means is provided bringing about relative movement between the rod and the bore from a first position in which the end of the rod lies in the bore to a second position in which the end lies in the recess.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

The present invention solves the problems of the prior art by using a procedure in which the blowing rod is introduced into a chamber filled with the thermoplastic material. A relative movement between the rod and an exit opening of the chamber causes a tube of the plastic to surround the rod and to be carried into a mold. After the tube has been pulled out in this manner, the plastic in the chamber and the remaining plastic in the mold are separated by a cutting operation. Preferably, the chamber contains the plastic ina molten condition with sufficient viscosity to preventit from leaving the chamber during the introduction of the air rod. The shape of the opening to the chamber as well as the length of the opening within a relatively thick chamber wall determines the outside dimensions of the tube; the inside dimension is determined by the size of the air rod. In this way, the necessity for the high pressure used in injection blow molding is done away with and the provision of a special nozzle for the production of a tube (as used in injecting blow molding) is eliminated. At the same time, under ideal conditions, the withdrawal of the air rod compares favorably with the extrusion of a tube, because the inside wall of the opening is the only frictional surface and practically no relative movement exists between the blow rod and the surrounding plastic. The separation of the raw piece at a position where the stream of plastic is solid permits a discontinuous extrusion procedure to take place without impairing the raw pieces which follow. The opportunity to center the blow rod by a holding device positioned outside of the chamber prevents any non-uniformity of the plastic tube surrounding the blow rod, as is often created by the nozzle of the known extrusion devices.

Figure 1:
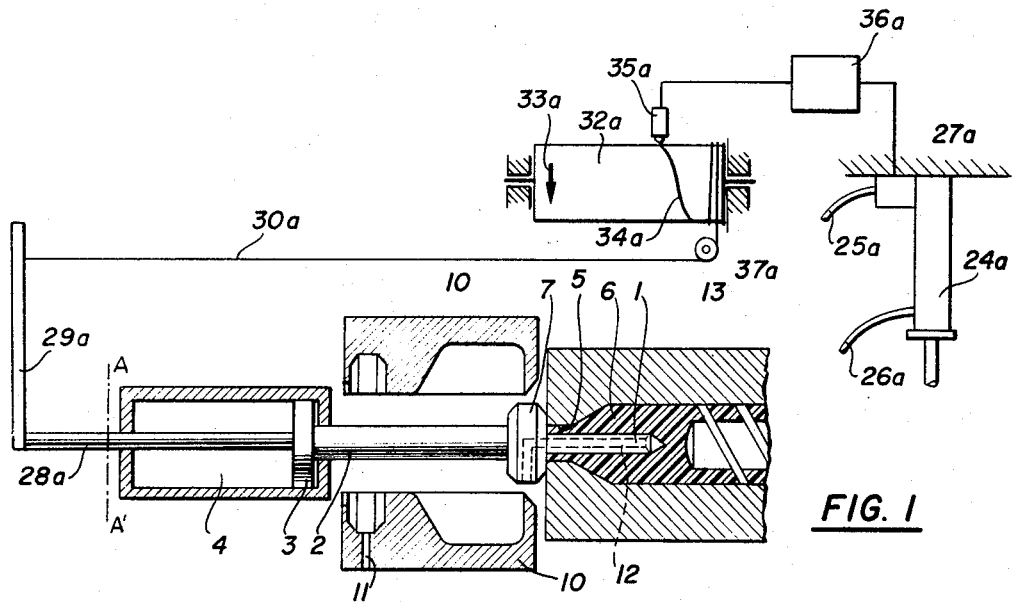
FIG. 1 is a vertical sectional view of apparatus embodying the principles of the present invention with the apparatus shown in a first condition.

Referring first to FIG. 1, wherein are best shown the general features of the invention, the blow rod 1 is shown as fastened to a piston rod 2. A piston 3 is mounted on the piston rod and is movable within a cylinder 4. This cylinder brings about movement of the air rod 1 by means of pressure air supplied from a controlled source in the manner well-known in the art. Between the blow rod 1 and the piston rod 2 is mounted a flange 7. The blow rod 1 is pressed into the opening 5 of a chamber 6 in an extruder until the flange 7 closes off the opening 5, as best shown in FIG. 1.

With the opening 5 closed by the flange 7, a pressure is created in the chamber 6 by the operation of a feed means such as a screw 13. At the same time that the pressure is created within the chamber, the piston 4 is moved away from the chamber, so that the air rod 1 together with a surrounding tube 8 of plastic is withdrawn from the chamber opening until a second position is reached, as shown in FIG. 2.

Figure 3:
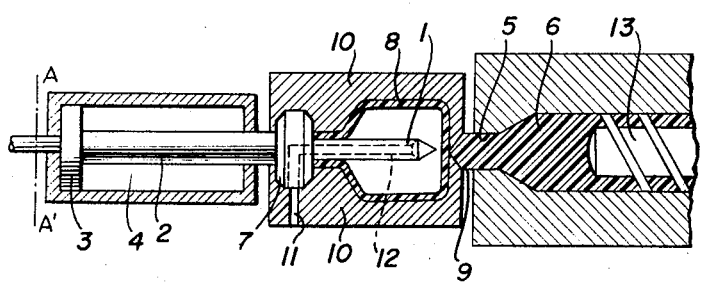
FIG. 3 is a sectional view of the apparatus shown in a third condition.

A blow mold 10 is prrovided consisting of two parts which come together to form the main cavity. The raw piece is cut off while still solid at the point 9, as shown in FIG. 3. Compressed air is introduced into the blow rod 1 through air passages 11 and 12 and this expands the raw tube 8 and presses the material against the inner walls of the cavity in the mold as shown in FIG. 3.

Figure 2:
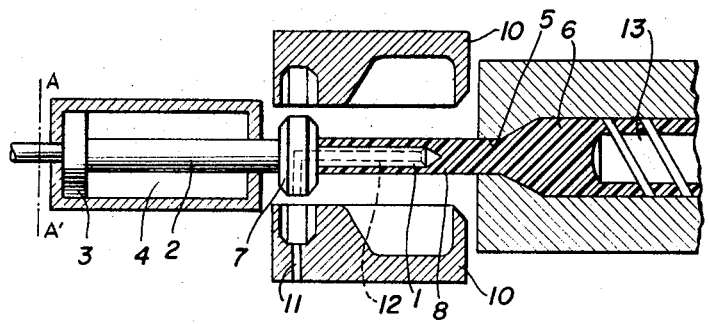
FIG. 2 is a sectional view of the apparatus shown in a second condition.

In the form of the invention shown in FIGS. 1, 2, and 3, the stripping of the formed article is accomplished after swinging the air rod and the cylinder around the vertical axis indicated by the line A—A and shown in dotted lines. The swinging movement and the stripping action which follows are not shown in detail in the drawings.

A connecting means such as a cylinder 24a is joined to the screw 13 so that it may be retracted from the position shown in FIG. 1 to the position shown in FIG. 2.

The cylinder 24a is connected to an air pressure tank, not shown in the drawing, through lines 25a and 26a. From this air pressure tank the cylinder 24a may be supplied with air pressure to bring about the required movement of the screw 13. Between the supply line 25a (though which the cylinder is supplied with pressure to bring about the movement of the conveyor 13 from the position of FIG. 1 to the position of FIG. 2) and the cylinder 24a is located a valve 27a which controls the supply of air pressure in accordance with the movement of the blow rod 1. For this purpose, the piston 3 is equipped with an additional piston rod 28a extending in the opposite direction to the piston rod 2, the piston rod 28a passing out of the cylinder. The piston rod 28a carries an arm 29a to which is fastened a cable 30a. This cable passes over a guide pulley 31a and is wound around a drum 32a with a plurality of windings. The drum 32a is rotatably supported on its ends and is connected to a spiral spring, not shown by which means the drum 32a is rotatably biased in the direction opposite to the arrow 33a. In this way the drum 32a acts to roll up the cable 30a. On the drum 32a is fastened a track 34; this is done by gluing or the like, depending on the type of track and its gradiant. Furthermore, there is located adjacent the drum 32a a reflex-photocell 35a through which the track 34 may be scanned. This photocell is connected to an amplifier 36a which increases the signal produced by the photocell and transfers the signal to the valve 27a for its control. As soon as the blow rood 1 leaves the position shown in FIG. 1, the valve 27a is informed of the movement of the piston 3 by means of a switch, not shown, so that air pressure acts on the cylinder 24a. The amount of air pressure is selected in such a way that the screw 13 moves relatively slowly out of the position shown in FIG. 1 and into the position shown in FIG. 2. Through the movement of the piston 3 and with it the movement of the blow rod 1, the drum 32a is turned in the direction of arrow 33a by the cable 30. As soon as the track 34a is recognized by the photocell 35a, the cell sends a signal too the amplifier 36a which, in turn, sends a signal to the valve 27a as a switch-off impulse. By a suitable selection of the shape of the track 34a, the advance of the screw 13 can be coordinated with the movement of the piston 3 and the air rod 1.

Figure 4:
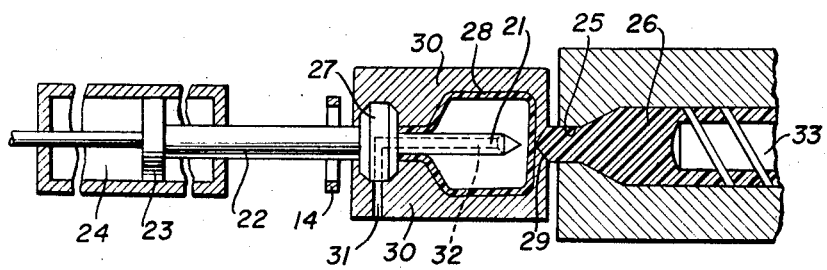
FIG. 4 is a vertical sectional view of a modified form of the apparatus.

FIG. 4 shows a simple modification of the invention in which the stripping of the formed article is brought about by an axial movement, so that no swinging or turning movement has to be made. For this operation it is only necessary that the cylinder 24 and the piston 23 be located a sufficient distance from the chamber opening, so that, after the opening of the mold 30, the air rod 21 may be pulled by the piston rod 22 even further back to a third position, while a stripper 14 pulls off the formed article from the blow rod 21.

The stripper has the shape of a ring and its inside diameter is larger than the outside diameter of the flange, so that the flange 27 may go through the stripper 14 without interference. On the other hand, the inside diameter is small enough so that the formed article 28 will strike it and be removed from the air rod. Ater stripping, the air rod is brought back into a position similar to that shown in FIG. 1, so that the working cycle may be repeated. The extruder has a screw 33 for producing pressure on the molten plastic in the chamber 26 to press it through the opening 25 as before. The flow of plastic is cut off at the point 29 and the air passages 31 and 32 provide the pressure air for blowing.

Figure 5:
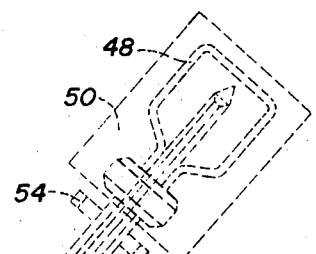
FIG. 5 is a sectional view of another modification of the apparatus.

FIG. 5 shows a variation of the invention in which an air rod 41 is stationary and the opening in the chamber 46 is formed by a slidable sleeve 45a, which is movable within the bore 45b of the chamber. Pinion gears 55 and 55' engage a rack 56 and 56' formed on the outside surface of the sleeve, and the sleeve can be pulled over the air rod 41 to a position indicated by dotted lines until the sleeve rests against the flange 47. When the pressure is created by the worm gear 53 within the chamber 46, the space formed by the air rod 41, the inside of the sleeve and the flange 47 is filled up completely with plastic material. After that, the sleeve 55a is returned to the housing to the position shown in full lines. The air rod 41 and cylinder 44 are then swung about a hinge pin 57 into a position where the plastic is engaged by the mold 50 moving in to allow the blow forming of the article within the mold recess by pressure air operating through passages 51, 52 in the hinge 57, piston 43, rod 42, and the air rod 41. Stripping of the finished article 48 is accomplished by the ring 54.

Figure 6:
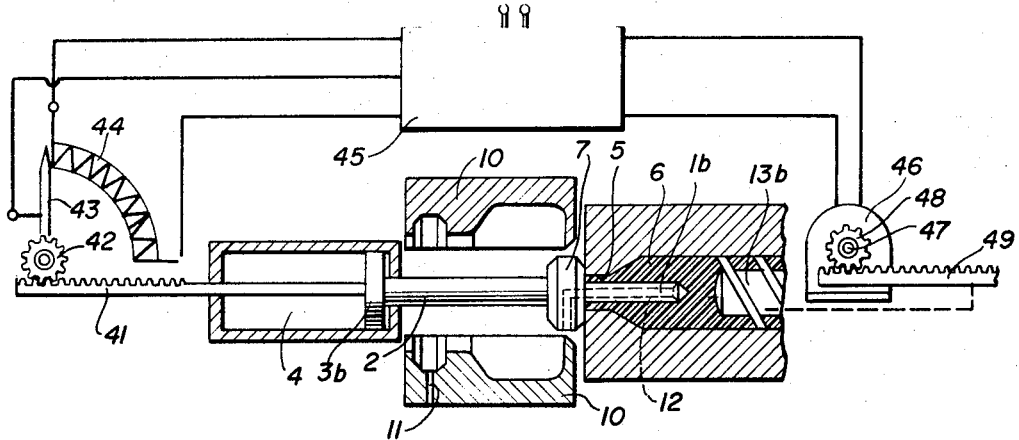
FIG. 6 is a vertical sectional view of another modified form of the invention.

In the version of the invention shown in FIG. 6, the movement of the transport screw 13b is controlled electrically in accordance with the movement of the blow rod 1b. In this arrangement, the piston 3b is equipped with a gear rack 41 formed on the side of piston rod 2 which engages a gear 42 which is fixedly supported. This gear 42 is connected to a contact 43, which, during turning of the gear 42, slides along on arcuate potentiometer 44. To the potentiometer 44 and the contact 43 is connected an electrical control device 45 of known design from which is fed constant voltage durect-current electricity to the optentiometer 44. The contact 43 is caused to swing by the gear 41 and delivers a voltage signal which indicates at all times the true position of the gear rack 41 and, therefore, the position of the piston 3. Through the control device 45 this voltage signal is used for the on-and-off switching of an electric motor 46, which carries a gear 48 on its output shaft 47. The gear wwheel 48 engages a rack 49 which is mechanically connected to the screw 13 (as indicated by the dotted line) and so activates the axial displacement of the screw 13 in accordance with the position of the piston 3.

Figure 7:
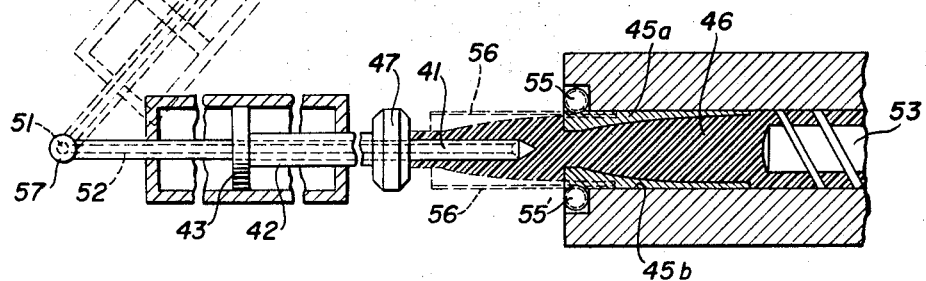
FIG. 7 is a vertical sectional view of another modification of the invention.
Figure 7:
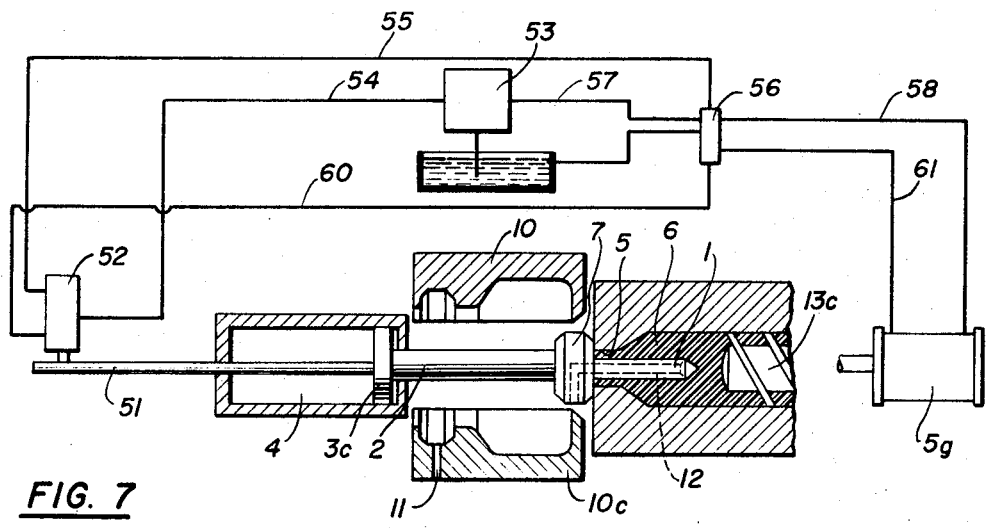

In the variation of the invention shown in FIG. 7 the piston 3c is provided with a piston rod 51 which extends through the end of the cylinder. This rod 51 acts on a valve 52 which is supplied with fluid pressure medium from a hydraulic pump 53. When the piston moves towards the left (from the position shown in FIG. 7), the valve 52 will be actuated by the rod 51 in such a way that the pressure fluid stream flowing through the pipe line 54 to the valve 52 reaches a piston valve 56. It switches the latter in such a way that the pressure fluid is able to flow to a piston-cylinder-unit 59 through the pipe line 57, the piston valve 56, and the pipe line 58. In this way the screw 13c is displaced axially in the direction of the mold 10c. This displacement of the transport conveyor 13c is made in accordance with the movement of the piston 3c. When the piston 3c moves back into the position shown in FIG. 7, the valve 52 is switched by the rod 51 in the opposite direction and the fluid stream is now able to flow through pipe line 54, valve 52, and pipe line 60 to the piston valve 56. This piston valve is now switched in such a way that the hydraulic stream may flow to the other side of the piston through pipe line 57, valve 56, and a pipe line 61. The transport conveyor 13 is in this way returned to its starting position.

The present invention has been described in a general way above. It may be practical in certain operations to use several air rods for a given sindle mold. During the blowing operation within the mold, the other air rod or rods may be brought to a desired temperature, or may be dipped into an opening in the melting chamber to be pre-warmed before pulling out a new raw tube. The melting chamber can be equipped with a number of openings, each of which can be provided with its own air rod. These openings could be arranged side-by-side or one above the other. Also, the fabrication of a complex article may be brought about in the simplest way, because the air rod may recieve, on the one hand, desired cross-section ratios and, on the other hand, may bring about, at the same time, with exceptional accuracy, the wall thickness distribution determined by the melting pressure and the flow velocity. All movements may be made with relatively small force because there is only the small resistance due to the flow of material to be overcome. An additional advantage of the invention consists in the fact that the air supply channels do not have to be dimensioned so closely becuase of the relatively small pressure within the melting chamber. There is no danger of the plugging of channels occurring because of metal present within the chamber.

Another important advantage of this invention is that the wall thickness can be determined by the retraction speed of the air rod, the pressure created within the chamber, and the viscosity of the molten plastic. This is in comparison with normal extrusion blowing procedure where changes of wall thickness of the raw parison may be made only by an adjustment of the relative sizes of the nozzle ring and core. Finally, the separation of the raw parison with a cutting device can be replaced now by adjusting the pressure within the chamber to a negative pressure and separation occurs automatically after the air rod has been completely pulled out. It will be understood that the closing of the mold can be brought about by a control apparatus which, at the same time, lowers the chamber pressure to cut off any movement of plastic through an opening. The mold, the flange, and the air rod, of course, are provided with continuous air passages for the blowing of the parison. The mold is also provided with recesses into which the flange is clamped when the mold is closed. This also brings about the arrangement of continuous passage of air into the main mold recess.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure Letters Patent it:

1. Apparatus for molding, comprising
   a. an extruder having an outlet bore and a feed means;
   b. a mold having a cavity aligned with the bore,
   c. a blow rod extending through the mold, and
   d. an actuator for bringing about relative movement between the rod and bore from a first position in which the rod lies in the bore to a second position in which the rod lies in the cavity, and e. means connecting the actuator and the feed means so that the latter is operated to press molten plastic through the bore at the same rate that the rod moves axially of the bore in moving from the first position to the second position, the rod being provided with a radially-extending flange which closes the bore when the rod is in the said first position, and an air passage extending through the flange to supply the air passage in the rod with pressure air when the rod is in the second position, the rod being movable to a third position for stripping a formed article, a ring-like stripper being provided with an aperture through which the rod passes in moving from the second position to the third position, and the aperture in the stripper being large enough to allow the passage of the flange, but not a portion of the formed article.

2. Apparatus for molding as recited in claim 1, wherein an air passage extends through the rod to a free end, and wherein the said free end is located in the recess only when the rod is in the said second position.

3. Apparatus for molding as recited in claim 1, wherein the mold is formed in two separable parts with a secondary recess in each half separated axially from the first-mentioned recess, wherein the secondary recesses serve, when the mold is closed, to clamp around the flange, and wherein a passage extends through the mold into a secondary recess to communicate with the air passage in the flange.

4. Apparatus for molding as recited in claim 1, wherein the mold is formed in two separable parts, each part having a wall adjacent the extruder, the walls having mating knife edges that meet when the mold is closed, so that, when the rod has moved to the second position with the free end within the recess and spaced from the side walls, a tube of plastic overlies the rod, but a solid cylinder of plastic extends from the free end of the rod to the extruder and the closure of the mold causes the knife edges to cut through the said cylinder.

5. Apparatus for molding as recited in claim 1, wherein the said actuator is a fluid cylinder having a piston rod coaxial with and connected to the blow rod.

6. Apparatus for molding, comprising:
a. an extruder having an outlet bore and a feed means,
b. a mold having a cavity aligned with the bore,
c. a blow rod extending through the mold, and
d. an actuator for bringing about relative movement between the rod and bore from a first position in which the rod lies in the bore to a second position in which the rod lies in the cavity, and
e. means connecting the actuator and the feed means so that the latter is operated to press molten plastic through the bore at the same rate that the rod moves axially of the bore in moving from the first position to the second position, the said bore being formed in a sleeve which is slidably mounted in a housing of the exruder, the said relative movement taking place by axial movement of the sleeve, and the movement of the sleeve being brought about by the engagement of a rotatable gear mounted in the housing engaging a rack formed on the exterior of the sleeve.

7. Apparatus for molding as recited in claim 6, wherein an air passage extends through the rod to a free end, and wherein the said free end is located in the recess only when the rod is in the said second position.

8. Apparatus for molding as recited in claim 6, wherein the rod is provided with a radially-extending flange which closes the bore when the rod is in the said first position, and wherein an air passage extends through the flange to supply the air passage in the rod with pressure air when the rod is in the second position.

9. Apparatus for molding as recited in claim 8, wherein the rod is movable to a third position for stripping a formed article, wherein a ring-like stripper is provided with an aperture through which the rod passes in moving from the second position to the third position, and wherein the aperture in the stripper is large enough to allow the passage of the flange, but not a portion of the formed article.

10. Apparatus for molding as recited in claim 8, wherein the mold is formed in two separable parts with a secondary recess in each half separated axially from the first-mentioned recess, wherein the secondary recesses serve, when the mold is closed, to clamp around the flange, and wherein a passage extends through the mold into a secondary recess to communicate with the air passage in the flange.

11. Apparatus for molding as recited in claim 6, wherein the mold is formed in two separable parts, each part having a wall adjacent the extruder, the walls having mating knife edges that meet when the mold is closed, so that, when the rod has moved to the second position with the free end within the recess and spaced from the said walls, a tube of plastic overlies the rod, but a solid cylinder of plastic extends from the free end of the rod to the extruder and the closure of the mold causes the knife edges to cut through the said cylinder.

12. Apparatus for molding as recited in claim 6, wherein the said actuator is a fluid cylinder having a piston rod coaxial with and connected to the blow rod.

13. Apparatus for molding as recited in claim 6, wherein the said bore is formed in a sleeve which is slidably mounted in a housing of the extruder, wherein the said relative movement takes place by axial movement of the sleeve, and wherein the movement of the sleeve is brought about by the engagement of a rotatable gear mounted in the housing engaging a rack formed on the exterior of the sleeve.

14. Apparatus for molding, comprising
a. an extruder having an outlet bore and a feed means,
b. a mold having a cavity aligned with the bore,
c. a blow rod extending through the mold, and
d. an actuator for bringing about relative movement between the rod and bore from a first position in which the rod lies in the bore to a second position in which the rod lies in the cavity, and
e. means connecting the actuator and the feed means so that the latter is operated to press molten plastic through the bore at the same rate that the rod moves axially of the bore in moving from the first position to the second position, the rod being movable to a third position for stripping a formed article, a ring-like stripper being provided with an aperture through which the rod passes in moving from the second position to the third position, and the aperture in the stripper being large enough to allow the passage of the rod, but not a portion of the formed article.

15. Apparatus for molding, comprising a. an extruder having an outlet bore and a feed means,
b. a mold having a cavity aligned with the bore, and being movable between a closed and an open position,
c. a blow rod extending through the mold, and
d. an actuator for bringing about relative movement between the rod and bore from a first position in which the rod lies in the bore to a second position in which the rod lies in the cavity, and
e. means connecting the actuator and the feed means so that the latter is operated to press molten plastic through the bore at the same rate that the rod moves axially of the bore in moving from the first position to the second position, the rod being provided with a radially-extending flange which closes the bore when the rod is in the said first position, and an air passage extending through the periphery of the flange to supply the air passage in the rod with pressure air when the rod is in the second position, and the mold having an air passage which mates with the air passage of the flange when the mold is in its closed position, to supply air to the air passage of the flange but the air passage in the mold is spaced from the air passage in the flange when the mold is in its open position.

* * * * *

UNITED STATES PATENT OFFICE
CERTIFICATE OF CORRECTION

Patent No. 3,751,207      Dated August 7, 1974

Inventor(s) Johannes Mehnert

It is certified that error appears in the above-identified patent and that said Letters Patent are hereby corrected as shown below:

On the Title page, in item 75 "Sieburg, Germany"

should read -- Menden uber Siegberg, Germany -- and in item 73 the assignee should read -- Siemag Siegener Maschinenbau Gesellschaft mit beschrankter Haftung, Hilchenbach-Dahlbruch, Bundesrepublik, Germany --.

Signed and sealed this 17th day of December 1974.

(SEAL)
Attest:

McCOY M. GIBSON JR.
Attesting Officer

C. MARSHALL DANN
Commissioner of Patents